United States Patent
Chang et al.

(10) Patent No.: US 11,800,054 B2
(45) Date of Patent: Oct. 24, 2023

(54) MULTIMEDIA AUDIO/VIDEO SYSTEM

(71) Applicant: REALTEK SEMICONDUCTOR CORPORATION, Hsinchu (TW)

(72) Inventors: Yi-Shu Chang, Hsinchu (TW); Pui-Kei Leong, Hsinchu (TW); Lien-Hsiang Sung, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 206 days.

(21) Appl. No.: 17/239,921

(22) Filed: Apr. 26, 2021

(65) Prior Publication Data

US 2021/0400232 A1  Dec. 23, 2021

(30) Foreign Application Priority Data

Jun. 19, 2020 (TW) .................................. 109120827

(51) Int. Cl.
*H04N 21/4363* (2011.01)
*H04N 7/10* (2006.01)
*G06F 3/16* (2006.01)

(52) U.S. Cl.
CPC ............. *H04N 7/104* (2013.01); *G06F 3/162* (2013.01); *H04N 21/4363* (2013.01)

(58) Field of Classification Search
CPC .................................................. H04N 21/4363
See application file for complete search history.

(56) References Cited

U.S. PATENT DOCUMENTS

| | | | |
|---|---|---|---|
| 8,798,155 B2 | 8/2014 | Cote et al. | |
| 2015/0326918 A1* | 11/2015 | Oh | H04N 21/4363 |
| | | | 348/445 |
| 2017/0055034 A1* | 2/2017 | Liu | H04N 21/43637 |
| 2018/0241161 A1* | 8/2018 | Hsu | H01R 13/646 |

FOREIGN PATENT DOCUMENTS

WO    WO02/49314 A2    6/2002

OTHER PUBLICATIONS

OA letter of the counterpart TW application (appl. No. 109120827) dated Jan. 27, 2021. Summary of the OA letter: Claim 1 is rejected under Patent Law Article 22(2) as being anticipated by reference 1 (U.S. Pat. No. 8,798,155B2).

* cited by examiner

*Primary Examiner* — Michael H Hong
(74) *Attorney, Agent, or Firm* — WPAT, P.C (57) ABSTRACT

A multimedia audio/video system includes a multimedia audio/video transmitting end and a multimedia audio/video receiving end. The multimedia audio/video transmitting end includes a multimedia data generator and a first data converter. The multimedia data generator is used to generate a multimedia data conforming to a first transmission protocol. The first data converter is used to convert the multimedia data conforming to the first transmission protocol into a multimedia data conforming to a second transmission protocol. The multimedia audio/video receiving end includes a second data converter which is used to convert the multimedia data conforming to the second transmission protocol into the multimedia data conforming to the first transmission protocol. The multimedia data conforming to the first transmission protocol is transmitted via multiple cables, while the multimedia data conforming to the second transmission protocol is transmitted via a single cable.

11 Claims, 7 Drawing Sheets

MULTIMEDIA AUDIO/VIDEO SYSTEM

BACKGROUND OF THE INVENTION

1. Field of the Invention

The present invention generally relates to multimedia audio/video systems, and, more particularly, to data transmission and reception of multimedia audio/video systems.

2. Description of Related Art

There are various transmission protocols for the signals or data in connection with panels, such as V-by-One (or Vby1 for short), embedded DisplayPort (eDP), Embedded Panel Interface (EPI), Clock-Embedded Differential Signaling (CEDS), Integrated-Stream Protocol (iSP), multiple point-to-point interfaces (e.g., China-Star P2P interface (CSPI), Chine P2P interface (CHPI), Chimei P2P interface (CMPI), etc). Unfortunately, these video and audio data transmission protocols are incompatible with one another, or even some of them are not prevalent, which is unfavorable for the development and integration of related products. Moreover, because these audio/video data transmission protocols are low in bandwidth and data rate, the transmission of a large quantity of audio/video data (e.g., ultra-high-quality audio/video content) over these protocols requires a large number of physical cables, resulting in assembly difficulty, large size, and increased cost, which render the products less competitive.

SUMMARY OF THE INVENTION

In view of the issues of the prior art, an object of the present invention is to provide a multimedia audio/video system, so as to make an improvement to the prior art.

A multimedia audio/video system is provided. The multimedia audio/video system includes a multimedia audio/video transmitting end and a multimedia audio/video receiving end. The multimedia audio/video transmitting end includes a multimedia data generator and a first data converter. The multimedia data generator is configured to generate a multimedia data conforming to a first transmission protocol. The first data converter is coupled to the multimedia data generator and configured to convert the multimedia data conforming to the first transmission protocol into a multimedia data conforming to a second transmission protocol. The multimedia audio/video receiving end includes a second data converter. The second data converter is configured to convert the multimedia data conforming to the second transmission protocol into a multimedia data conforming to the first transmission protocol. The multimedia data conforming to the first transmission protocol is transmitted through a plurality of cables, and the multimedia data conforming to the second transmission protocol is transmitted through a single cable.

A multimedia audio/video system is also provided. The multimedia audio/video system includes a multimedia audio/video transmitting end and a multimedia audio/video receiving end. The multimedia audio/video transmitting end includes a multimedia data generator, a first data converter, and a second data converter. The multimedia data generator is configured to generate a first multimedia data and a second multimedia data. The first multimedia data conforms to a first transmission protocol, and the second multimedia data conforms to a second transmission protocol. The first data converter is coupled to the multimedia data generator and configured to convert the first multimedia data into a third multimedia data which conforms to a third transmission protocol. The second data converter is coupled to the multimedia data generator and the first data converter and configured to receive the second multimedia data and the third multimedia data and pack the second multimedia data and the third multimedia data to generate a fourth multimedia data, which conforms to the third transmission protocol. The multimedia audio/video receiving end includes a third data converter and a fourth data converter. The third data converter is configured to receive the fourth multimedia data and unpack the fourth multimedia data to generate the second multimedia data and the third multimedia data. The fourth data converter is coupled to the third data converter and configured to receive the third multimedia data and convert the third multimedia data into the first multimedia data. The first multimedia data conforming to the first transmission protocol and the second multimedia data conforming to the second transmission protocol are transmitted through a plurality of cables, and the third multimedia data conforming to the third transmission protocol is transmitted through a single cable.

The present invention provides a cascade transmission technology for multimedia audio/video data. Conventionally, the multimedia audio/video data was transmitted through multiple physical connecting wires or cables. However, with the present invention, the multimedia audio/video data can be transmitted through a single physical connecting wire or cable. Therefore, this invention has the advantages of convenience improvement, reduction in assembly complexity, reduced interface volume, lower costs, and enhanced competitiveness in products.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be interpreted accordingly. The disclosure herein includes a multimedia audio/video system. On account of that some elements of the multimedia audio/video system could be known to person having ordinary skill the art, the detail of such elements is omitted provided that such detail has little to do with the features of this disclosure, and that this omission nowhere dissatisfies the specification and enablement requirements. Those skilled in the art can choose components equivalent to those described in this specification to carry out the present invention, which means that the scope of this invention is not limited to the embodiments in the specification.

Figure 1:
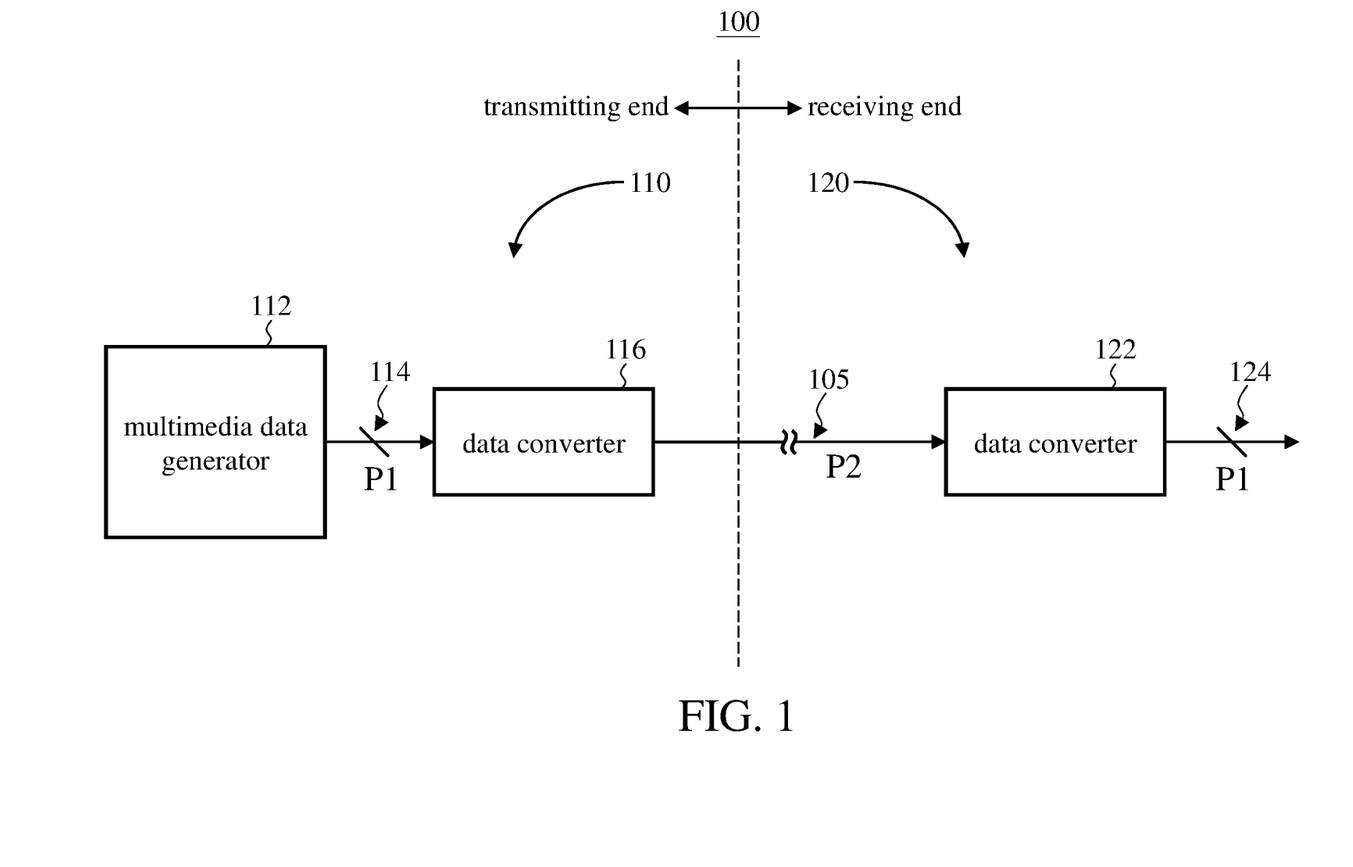
FIG. 1 is a functional block diagram of the multimedia audio/video system according to an embodiment of the present invention.

FIG. 1 is a functional block diagram of the multimedia audio/video system according to an embodiment of the present invention. The multimedia audio/video system 100 includes a transmitting end 110 and a receiving end 120, which are connected through a connecting wire 105. The transmitting end 110 includes a multimedia data generator 112 and a data converter 116, which are connected through a connecting wire 114. The receiving end 120 includes a data converter 122 and a connecting wire 124. The specifications of the connecting wire 114 and the connecting wire 124 conform to or follow a first transmission protocol, while the specification of the connecting wire 105 conforms to or follows a second transmission protocol which is different from the first transmission protocol. In other words, the connecting wire 114 and the connecting wire 124 are used to transmit the multimedia data P1 conforming to the first transmission protocol, and the connecting wire 105 is used to transmit the multimedia data P2 conforming to the second transmission protocol. The multimedia data P1 conforming to the first transmission protocol is generated by the multimedia data generator 112 and may include video data, audio data, control signals, etc. The data converter 116 converts the multimedia data P1 conforming to the first transmission protocol into the multimedia data P2 conforming to the second transmission protocol, and the data converter 122 converts the multimedia data P2 conforming to the second transmission protocol into the multimedia data P1 conforming to the first transmission protocol.

In some embodiments, the transmitting end 110 is, for example, a signal source device such as a set-top box, a graphics card, and a game console, and the receiving end 120 is, for example, a panel. The video data in the multimedia data P1 conforming to the first transmission protocol can be displayed on the panel, and the control signal in the multimedia data P1 conforming to the first transmission protocol can be used to control the backlight of the panel.

In some embodiments, the connecting wire 114 and the connecting wire 124 include multiple physical cables, whereas the connecting wire 105 includes only one cable. The bandwidth and data rate of the connecting wire 105 are greater than or equal to the sum of the bandwidths and the sum of the data rates of all cables included in the connecting wire 114 and are also greater than or equal to the sum of the bandwidths and the sum of the data rates of all cables included in the connecting wire 124. The first transmission protocol is a transmission protocol for the signals or data in connection with panels and includes, but not limited to, V-by-One, eDP, EPI, CEDS, iSP, CSPI, CHPI, and CMPI, whereas the second transmission protocol is for the transmission of multimedia data and control signals and includes, but not limited to, the High Definition Multimedia Interface (HDMI), the USB Type-C (USB-C for short), and user-developed transmission interfaces (e.g., a transmission interface modified based on the HDMI or USB Type-C specifications, or a transmission interface derived from the HDMI or USB Type-C specifications).

Figure 2:
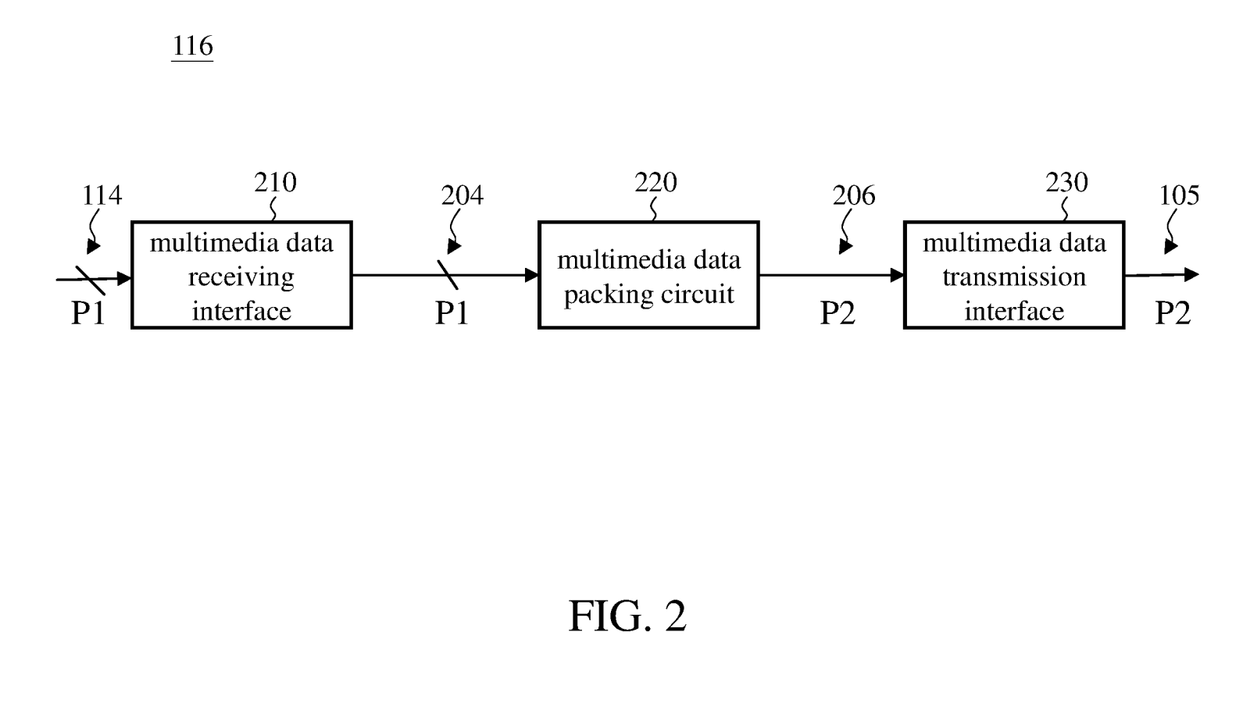
FIG. 2 is a functional block diagram of the data converter 116 of FIG. 1 according to one embodiment.

FIG. 2 is a functional block diagram of the data converter 116 according to one embodiment of the present invention. The data converter 116 includes a multimedia data receiving interface 210, a multimedia data packing circuit 220, and a multimedia data transmission interface 230. The multimedia data receiving interface 210 is an interface of the first transmission protocol and configured to receive, through the connecting wire 114, the multimedia data P1 conforming to the first transmission protocol that the multimedia data generator 112 generates, and to transmit, through the connecting wire 204, the multimedia data P1 conforming to the first transmission protocol to the multimedia data packing circuit 220. The multimedia data packing circuit 220 packs, encodes and/or converts, according to the specifications of the second transmission protocol, the multimedia data P1 conforming to the first transmission protocol into the multimedia data P2 conforming to the second transmission protocol, and transmits the multimedia data P2 through the connecting wire 206 to the multimedia data transmission interface 230. The multimedia data transmission interface 230 is an interface of the second transmission protocol and configured to output the multimedia data P2 conforming to the second transmission protocol through the connecting wire 105. The operations of packing, encoding and/or converting data according to the standards of the second transmission protocol are well known to people having ordinary skill in the art, and the details are thus omitted for brevity. Please refer to section 5.3 of the HDMI standard for the details.

Figure 3:
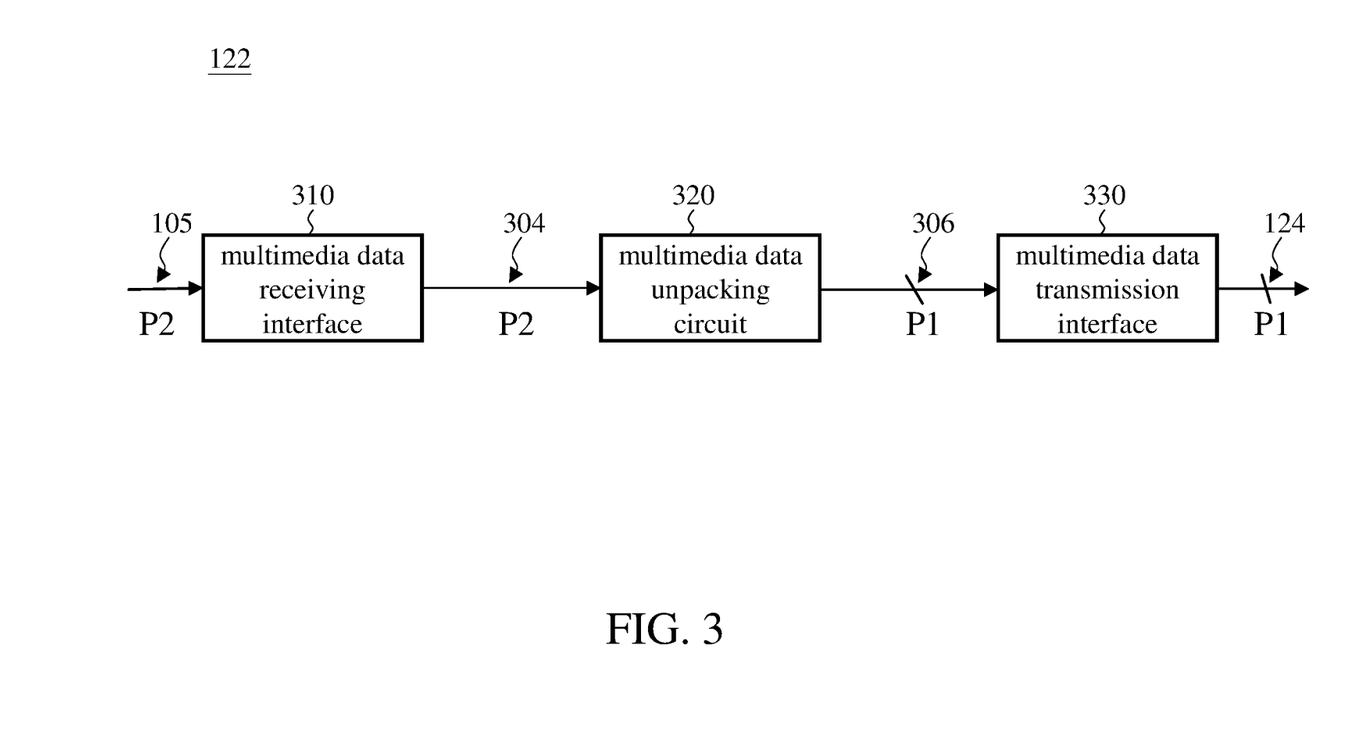
FIG. 3 is a functional block diagram of the data converter 122 of FIG. 1 according to one embodiment.

FIG. 3 is a functional block diagram of the data converter 122 according to one embodiment of the present invention. The data converter 122 includes a multimedia data receiving interface 310, a multimedia data unpacking circuit 320, and a multimedia data transmission interface 330. The multimedia data receiving interface 310 is an interface of the second transmission protocol and configured to receive the multimedia data P2 conforming to the second transmission protocol through the connecting wire 105 and to transmit the multimedia data P2 conforming to the second transmission protocol to the multimedia data unpacking circuit 320 through the connecting wire 304. The multimedia data unpacking circuit 320 unpacks, decodes and/or converts the multimedia data P2 conforming to the second transmission protocol according to the specifications of the second transmission protocol to obtain the multimedia data P1 conforming to the first transmission protocol and transmits the multimedia data P1 conforming to the first transmission protocol to the multimedia data transmission interface 330 through the connecting wire 306. The multimedia data transmission interface 330 is an interface of the first transmission protocol and configured to output the multimedia data P1 conforming to the first transmission protocol through the connecting wire 124. The operations of unpacking, decoding and/or converting data according to the specifications of the second transmission protocol are well known to people having ordinary skill in the art, and the details are thus omitted for brevity. Please refer to Section 5.3 of the HDMI standard for the details.

Figure 4:
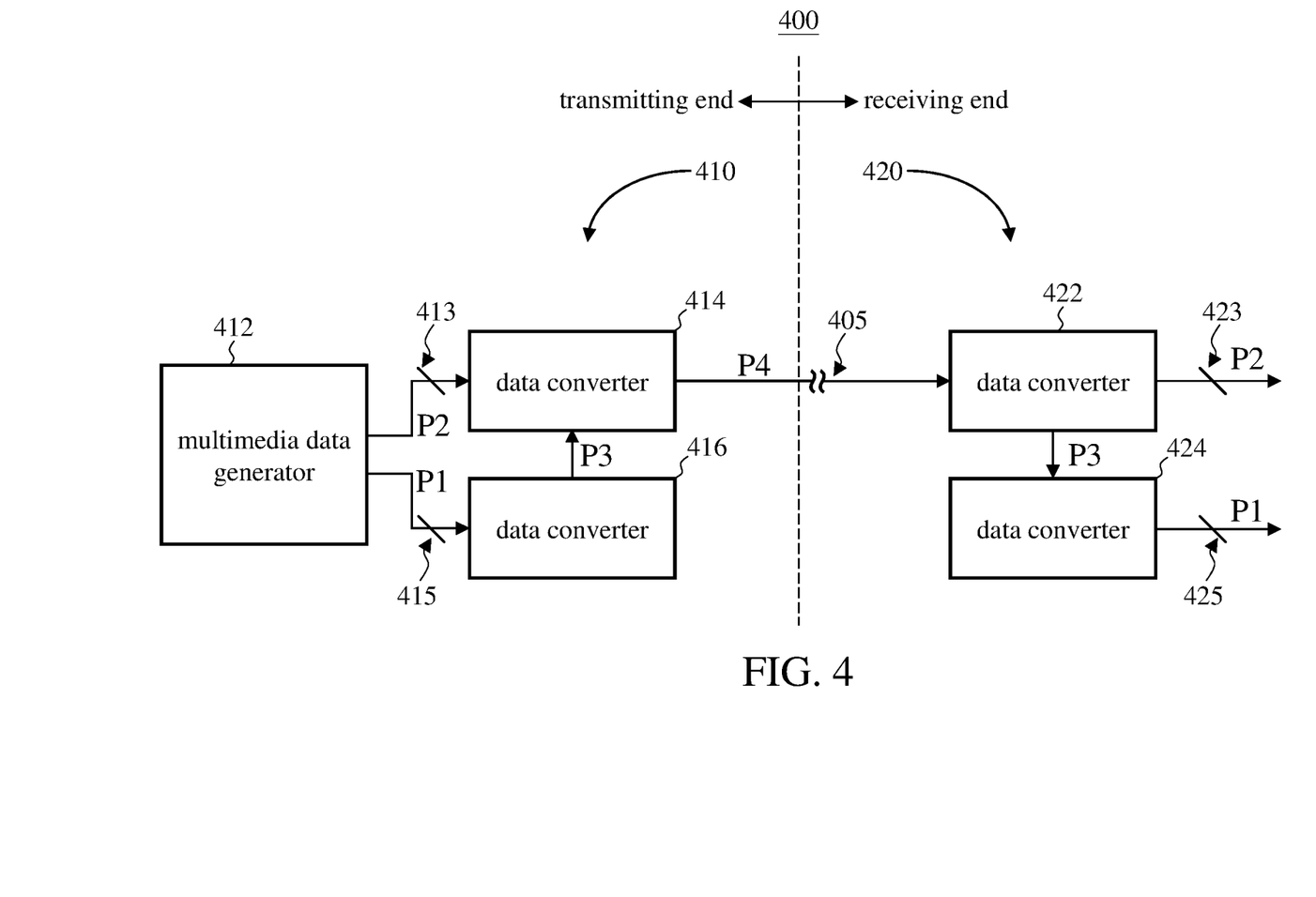
FIG. 4 is a functional block diagram of the multimedia audio/video system according to another embodiment of the present invention.

FIG. 4 is a functional block diagram of the multimedia audio/video system according to another embodiment of the present invention. The multimedia audio/video system 400 includes a transmitting end 410 and a receiving end 420, which are connected through a connecting wire 405. The transmitting end 410 includes a multimedia data generator 412, a data converter 414, and a data converter 416. The multimedia data generator 412 is connected to the data converter 414 and the data converter 416 through the connecting wire 413 and the connecting wire 415, respectively. The receiving end 420 includes a data converter 422 and a data converter 424. The data converter 422 and the data converter 424 output data through the connecting wire 423 and the connecting wire 425, respectively. The connecting wire 405 is a single physical cable, whereas the connecting wire 413, the connecting wire 415, the connecting wire 423, and the connecting wire 425 each include multiple physical cables.

The multimedia data generator 412 generates the multimedia data P1 conforming to the first transmission protocol and the multimedia data P2 conforming to the second transmission protocol. The multimedia data P1 conforming to the first transmission protocol and the multimedia data P2 conforming to the second transmission protocol are transmitted to the data converter 416 and the data converter 414 through the connecting wire 415 and the connecting wire 413, respectively. The data converter 416 converts the multimedia data P1 conforming to the first transmission protocol into the multimedia data P3 conforming to the third transmission protocol and transmits the multimedia data P3 conforming to the third transmission protocol to the data converter 414. The data converter 414 packs, encodes and/or converts the multimedia data P2 conforming to the second transmission protocol and the multimedia data P3 conforming to the third transmission protocol into the multimedia data P4 conforming to the fourth transmission protocol and outputs the multimedia data P4 through the connecting wire 405 (i.e., the multimedia data P4 conforming to the fourth transmission protocol contains the multimedia data P2 conforming to the second transmission protocol and the multimedia data P3 conforming to the third transmission protocol).

In some embodiments, the third transmission protocol and the fourth transmission protocol are identical transmission protocols, and the first transmission protocol and the second transmission protocol are identical transmission protocols or different transmission protocols. For example, the third transmission protocol and the fourth transmission protocol can be the HDMI, USB-C, or user-developed transmission interfaces (e.g., a transmission interface modified based on the HDMI or USB Type-C specifications, or a transmission interface derived from the HDMI or USB Type-C specifications). The first transmission protocol and the second transmission protocol are transmission protocols for the signals or data in connection with panels, which transmission protocols include but not limited to V-by-One, eDP, EPI, CEDS, and iSP.

The data converter 422 receives the multimedia data P4 conforming to the fourth transmission protocol through the connecting wire 405 and unpacks, decodes and/or converts the multimedia data P4 conforming to the fourth transmission protocol to generate or restore the multimedia data P2 conforming to the second transmission protocol and the multimedia data P3 conforming to the third transmission protocol. The multimedia data P2 conforming to the second transmission protocol is outputted through the connecting wire 423, and the multimedia data P3 conforming to the third transmission protocol is transmitted to the data converter 424. The data converter 424 unpacks, decodes and/or converts the multimedia data P3 conforming to the third transmission protocol to generate or restore the multimedia data P1 conforming to the first transmission protocol and outputs the multimedia data P1 conforming to the first transmission protocol through the connecting wire 425.

Figure 5:
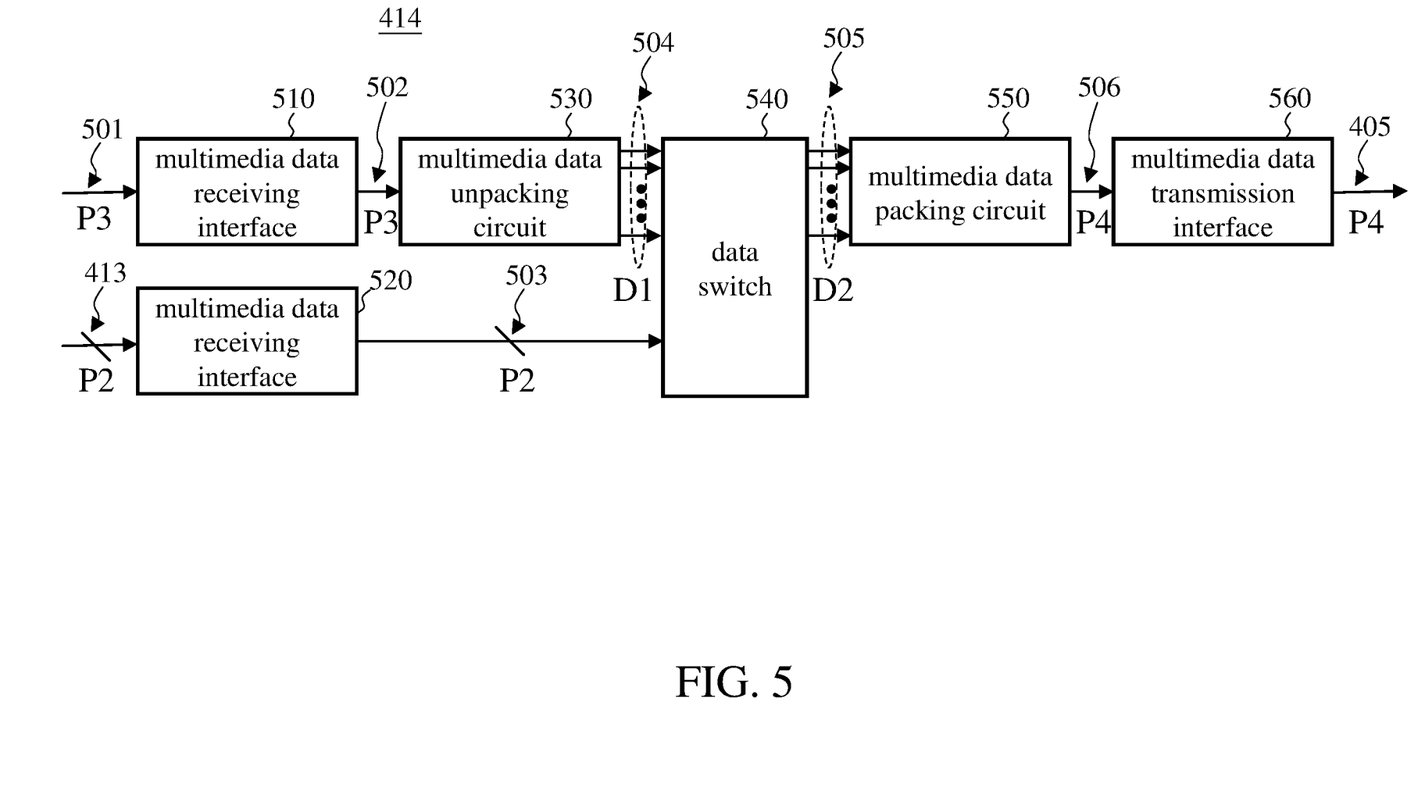
FIG. 5 is a functional block diagram of the data converter 414 of FIG. 4 according to one embodiment.

FIG. 5 is a functional block diagram of the data converter 414 according to one embodiment of the present invention. The data converter 414 includes a multimedia data receiving interface 510, a multimedia data receiving interface 520, a multimedia data unpacking circuit 530, a data switch 540, a multimedia data packing circuit 550, and a multimedia data transmission interface 560. The multimedia data receiving interface 510 is an interface of the third transmission protocol, and the multimedia data receiving interface 520 is an interface of the second transmission protocol. The multimedia data receiving interface 510 receives the multimedia data P3 conforming to the third transmission protocol from the data converter 416 through the connecting wire 501 and transmits the multimedia data P3 conforming to the third transmission protocol to the multimedia data unpacking circuit 530 through the connecting wire 502. The multimedia data receiving interface 520 receives the multimedia data P2 conforming to the second transmission protocol from the multimedia data generator 412 through the connecting wire 413. The multimedia data unpacking circuit 530 unpacks, decodes and/or converts, according to the specifications of the third transmission protocol, the multimedia data P3 conforming to the third transmission protocol to obtain the intermediate data D1 and transmits the intermediate data D1 to the data switch 540 through the multiple connecting wires 504. The intermediate data D1 include the contents (the remaining after the removal of the protocol format (the protocol format including, but not exclusively, headers)) of the multimedia data P3 conforming to the third transmission protocol.

The data switch 540 also receives the multimedia data P2 conforming to the second transmission protocol through the connecting wire 503. The data switch 540 combines the intermediate data D1 and the multimedia data P2 conforming to the second transmission protocol to generate the intermediate data D2. In other words, the intermediate data D2 contains the intermediate data D1 and the multimedia data P2 conforming to the second transmission protocol. In some embodiments, the data switch 540 allocates the bandwidths to the intermediate data D1 and the multimedia data P2 conforming to the second transmission protocol according to the data amount. For example, if the data amount of the intermediate data D1 is greater than the data amount of the multimedia data P2 conforming to the second transmission protocol, the data switch 540 allocates a larger bandwidth to the intermediate data D1 and a smaller bandwidth to the multimedia data P2 conforming to the second transmission protocol.

The multimedia data packing circuit 550 receives the intermediate data D2 from the data switch 540 through multiple connecting wires 505, packs, encodes and/or converts, according to the specifications of the fourth transmission protocol, the intermediate data D2 into the multimedia data P4 conforming to the fourth transmission protocol, and transmits the multimedia data P4 to the multimedia data transmission interface 560 through the connecting wire 506. The multimedia data transmission interface 560 is an interface of the fourth transmission protocol and configured to output the multimedia data P4 conforming to the fourth transmission protocol through the connecting wire 405.

The detailed circuit of the data converter 416 is substantially identical to that of the data converter 116 (as shown in FIG. 2), and repeated discussions is omitted herein for brevity.

Figure 6:
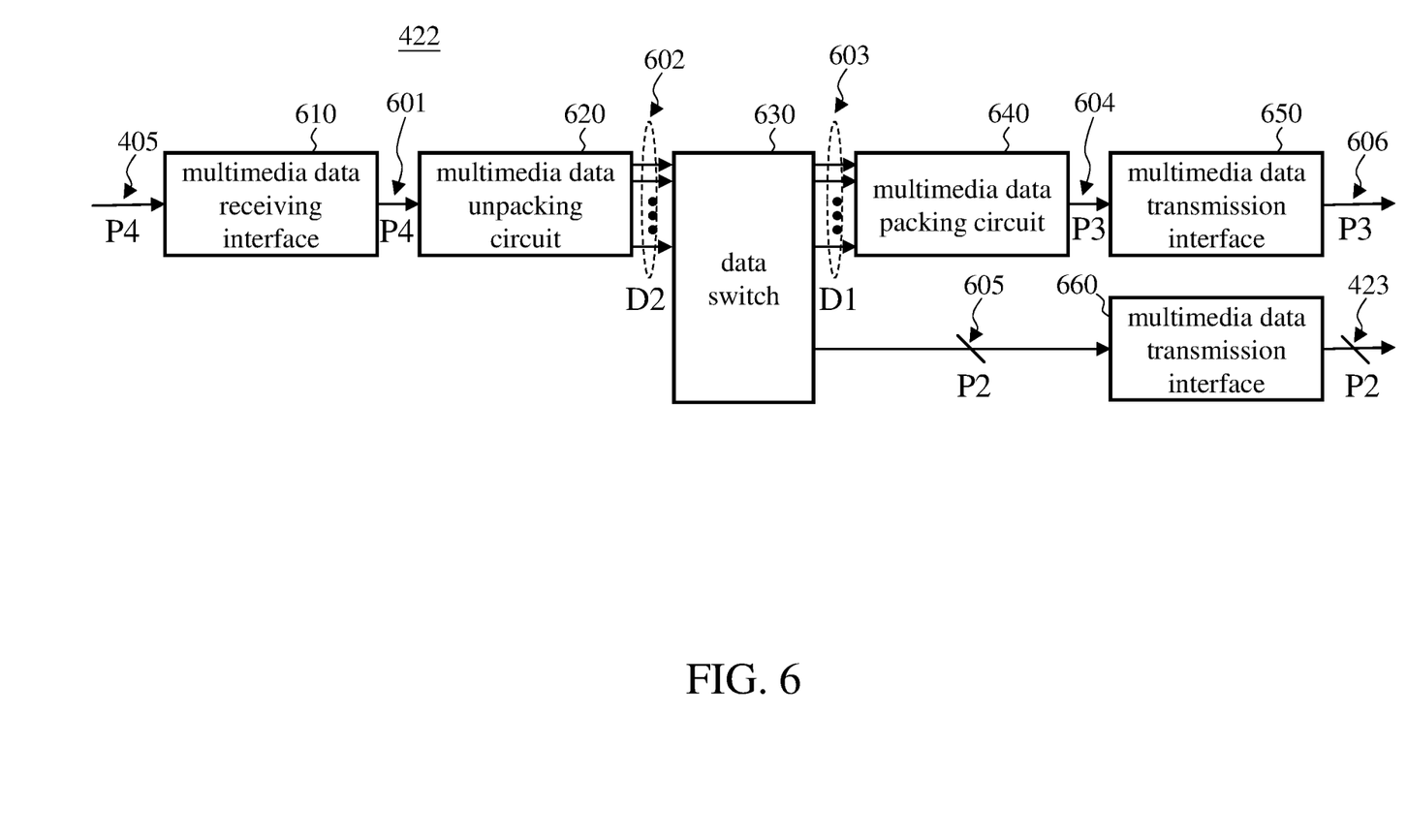
FIG. 6 is a functional block diagram of the data converter 422 of FIG. 4 according to one embodiment.

FIG. 6 is a functional block diagram of the data converter 422 according to one embodiment of the present invention. The data converter 422 includes a multimedia data receiving interface 610, a multimedia data unpacking circuit 620, a data switch 630, a multimedia data packing circuit 640, a multimedia data transmission interface 650, and a multimedia data transmission interface 660. The multimedia data receiving interface 610, which is an interface of the fourth transmission protocol, receives the multimedia data P4 conforming to the fourth transmission protocol through the connecting wire 405 and transmits the multimedia data P4 conforming to the fourth transmission protocol to the multimedia data unpacking circuit 620 through the connecting wire 601. The multimedia data unpacking circuit 620 unpacks, decodes and/or converts, according to the specifications of the fourth transmission protocol, the multimedia data P4 conforming to the fourth transmission protocol to obtain or restore the intermediate data D2 and transmits the intermediate data D2 to the data switch 630 through multiple connecting wires 602. The intermediate data D2 (which contains the intermediate data D1 and the multimedia data P2 conforming to the second transmission protocol) include the contents (the remaining after the removal of the protocol format (the protocol format including, but not exclusively, headers)) of the multimedia data P4 conforming to the fourth transmission protocol.

The data switch 630 distinguishes the intermediate data D1 from the multimedia data P2 conforming to the second transmission protocol according to the content of the data (e.g., according to the headers of the packets) and then transmits the intermediate data D1 to the multimedia data packing circuit 640 through multiple connecting wires 603 as well as transmits the multimedia data P2 conforming to the second transmission protocol to the multimedia data transmission interface 660 through the connecting wire 605. The multimedia data packing circuit 640 packs, encodes and/or converts, according to the specifications of the third transmission protocol, the intermediate data D1 into the multimedia data P3 conforming to the third transmission protocol and transmits the multimedia data P3 to the multimedia data transmission interface 650 through the connecting wire 604. The multimedia data transmission interface 650 is an interface of the third transmission protocol and configured to output the multimedia data P3 conforming to the third transmission protocol through the connecting wire 606. The multimedia data transmission interface 660 is an interface of the second transmission protocol and configured to output the multimedia data P2 conforming to the second transmission protocol through the connecting wire 423.

The detailed circuit of the data converter 424 is substantially identical to that of the data converter 122 (as shown in FIG. 3), and repeated discussions is omitted herein for brevity.

The number of data converters in FIG. 4 is intended to illustrate the invention by way of examples, rather than to limit the scope of the claimed invention. In other embodiments, the transmitting end 410 and the receiving end 420 may each include more than three data converters. The transmitting end 410 and the receiving end 420 have the same number of data converters.

Figure 7:
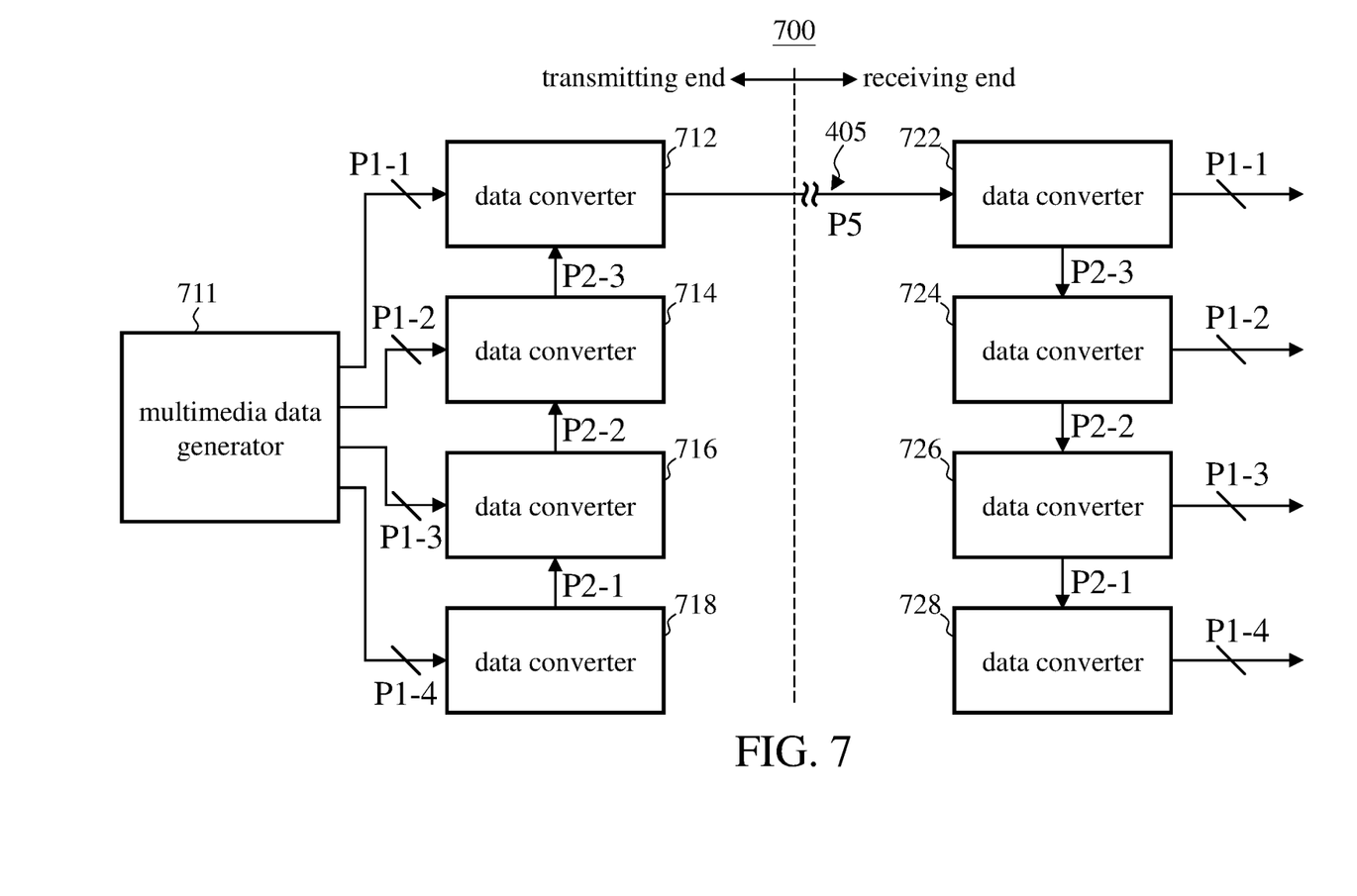
FIG. 7 is a functional block diagram of the multimedia audio/video system according to another embodiment of the present invention.

FIG. 7 is a functional block diagram of the multimedia audio/video system according to another embodiment of the present invention. The transmitting end of the multimedia audio/video system 700 includes a multimedia data generator 711, a data converter 712, a data converter 714, a data converter 716, and a data converter 718. The receiving end of the multimedia audio/video system 700 includes a data converter 722, a data converter 724, a data converter 726, and a data converter 728. The transmitting end and the receiving end are connected through the connecting wire 405.

In this embodiment, the multimedia data generator 711 generates ultra-high-quality audio/video content (e.g., with a frame rate of 120 Hz and a resolution of 8K×4K) and outputs the audio/video content through the four paths evenly, and the four paths are of the same transmission protocol. In other words, the multimedia data P1-1, the multimedia data P1-2, the multimedia data P1-3, and the multimedia data P1-4 can be multimedia data transmitted over the V-by-One protocol with a frame rate of 120 Hz and a resolution of 2K×4K (i.e., the multimedia data P1-1, P1-2, P1-3 and P1-4 each have a data amount (or resolution) of one-fourth of the original audio/video content).

The data converter 718 packs, encodes and/or converts the multimedia data P1-4 into the multimedia data P2-1 conforming to the HDMI protocol or format (with a frame rate of 120 Hz and a resolution of 2K×4K). The internal circuit of the data converter 718 is shown in FIG. 2, and repeated discussions is omitted herein for brevity. The data converter 716 packs, encodes and/or converts the multimedia data P1-3 and the multimedia data P2-1 into the multimedia data P2-2 conforming to the HDMI protocol or format (with a frame rate of 120 Hz and a resolution of 4K×4K) (i.e., the multimedia data P2-2 contains the multimedia data P1-3 and the multimedia data P2-1). The data converter 714 packs, encodes and/or converts the multimedia data P1-2 and the multimedia data P2-2 into the multimedia data P2-3 conforming to the HDMI protocol or format (with a frame rate of 120 Hz and a resolution of 6K×4K) (i.e., the multimedia data P2-3 contains the multimedia data P1-2 and the multimedia data P2-2). The data converter 712 packs, encodes and/or converts the multimedia data P1-1 and the multimedia data P2-3 into the multimedia data P5 conforming to the HDMI protocol or format (with a frame rate of 120 Hz and a resolution of 8K×4K) (i.e., the multimedia data P5 contains the multimedia data P1-1 and the multimedia data P2-3). The multimedia data P5 is transmitted to the receiving end through the connecting wire 405 conforming to the HDMI protocol or format. The internal circuits of the data converter 712, the data converter 714, and the data converter 716 are shown in FIG. 5, and repeated discussions is omitted herein for brevity.

The data converter 722 receives the multimedia data P5 through the connecting wire 405 and unpacks, decodes and/or converts the multimedia data P5 to obtain the multimedia data P1-1 and the multimedia data P2-3. The data converter 724 unpacks, decodes and/or converts the multimedia data P2-3 to obtain the multimedia data P1-2 and the multimedia data P2-2. The data converter 726 unpacks, decodes and/or converts the multimedia data P2-2 to obtain the multimedia data P1-3 and the multimedia data P2-1. Finally, the data converter 728 unpacks, decodes and/or converts the multimedia data P2-1 to obtain the multimedia data P1-4.

In the example of FIG. 7, even though the multimedia data P1-1, the multimedia data P1-2, the multimedia data P1-3, and the multimedia data P1-4 are each transmitted over 16 lanes (i.e., the output interface of the multimedia data generator 711 contains 64 lanes), a single physical cable (i.e., the connecting wire 405) is required between the transmitting end and the receiving end of the multimedia audio/video system 700. In contrast, for a similar arrangement in the prior art, at least four physical cables (each containing 16 lanes) are required to connect the data converters between the transmitting end and the receiving end. Thus, the present invention simplifies the data interface between the transmitting end and the receiving end of the multimedia audio/video system to a great extent.

Note that although the HDMI and USB-C include multiple lanes, in general all lanes would be used together and cannot be used separately since the connectors of the HDMI and USB-C conform to the established hardware specifications that are specified by the protocols. In other words, the multiple lanes of the HDMI and USB-C are regarded as a unity when using, that is, the multiple lanes are being used as a single cable from the user's perspective. Furthermore, since the bandwidths and/or data rates of the HDMI and USB-C are greater than those of the V-by-One, eDP, EPI, CEDS, and iSP protocols, a single HDMI cable or a single USB-C cable is equivalent to a combination of multiple cables of the V-by-One, eDP, EPI, CEDS, and iSP protocols in terms of the transmission performance (i.e., bandwidth and/or data rate). This, however, does not place a limitation to the present invention. For example, in an alternative embodiment of the present invention, the established hardware specifications of the HDMI and USB-C can also be used to implement the transmission specifications that are modified or derived by the user (e.g., implementations based on a particular packet transmission mechanism or lane control mechanism).

In summary, the present invention provides a cascade transmission technology for multimedia audio/video data. With this technology, multimedia audio/video data which was transmitted through multiple physical connecting wires or cables using the conventional technology can now be transmitted through a single physical connecting wire or cable. Therefore, this invention has the advantages of convenience improvement, reduction in assembly complexity, reduced interface volume, lower costs, and enhanced product competitiveness.

Various functional components or blocks have been described herein. As appreciated by persons skilled in the art, in some embodiments, the functional blocks can preferably be implemented through circuits (either dedicated circuits, or general purpose circuits, which operate under the control of one or more processors and coded instructions), which typically comprise transistors or other circuit elements that are configured in such a way as to control the operation of the circuitry in accordance with the functions and operations described herein. As further appreciated by persons skilled in the art, the specific structure or interconnections of the circuit elements can typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

The shape, size, and ratio of any element in the disclosed figures are exemplary for understanding, not for limiting the scope of this invention.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:
1. A multimedia audio/video system, comprising:
a multimedia audio/video transmitting end, comprising:
a multimedia data generator configured to generate a first multimedia data and a second multimedia data, wherein the first multimedia data conforms to a first transmission protocol, and the second multimedia data conforms to a second transmission protocol;
a first data converter coupled to the multimedia data generator and configured to convert the first multimedia data into a third multimedia data, wherein the third multimedia data conforms to a third transmission protocol; and
a second data converter coupled to the multimedia data generator and the first data converter and configured to receive the second multimedia data and the third multimedia data and pack the second multimedia data and the third multimedia data to generate a fourth multimedia data, wherein the fourth multimedia data conforms to the third transmission protocol; and
a multimedia audio/video receiving end, comprising:
a third data converter configured to receive the fourth multimedia data and unpack the fourth multimedia data to generate the second multimedia data and the third multimedia data; and
a fourth data converter coupled to the third data converter and configured to receive the third multimedia data and convert the third multimedia data into the first multimedia data;
wherein the first multimedia data conforming to the first transmission protocol and the second multimedia data conforming to the second transmission protocol are transmitted through a plurality of cables, and the third multimedia data conforming to the third transmission protocol is transmitted through a single cable.

2. The multimedia audio/video system of claim 1, wherein the first transmission protocol and the second transmission protocol are transmission protocols for signals or data in connection with panels.

3. The multimedia audio/video system of claim 1, wherein the second transmission protocol is HDMI, USB-C, a transmission specification modified using HDMI hardware specifications, or a transmission specification modified using USB-C hardware specifications.

4. The multimedia audio/video system of claim 1, wherein the first transmission protocol is different from the second transmission protocol.

5. The multimedia audio/video system of claim 1, wherein the first transmission protocol is identical to the second transmission protocol.

6. The multimedia audio/video system of claim 1, wherein a bandwidth of the single cable is greater than or equal to a sum of bandwidths of the plurality of cables.

7. The multimedia audio/video system of claim 1, wherein a data rate of the single cable is greater than or equal to a sum of data rates of the plurality of cables.

8. The multimedia audio/video system of claim 1, wherein the second data converter comprises:
a first multimedia data receiving interface configured to receive the second multimedia data;
a second multimedia data receiving interface configured to receive the third multimedia data;
a multimedia data unpacking circuit coupled to the second multimedia data receiving interface and configured to unpack the third multimedia data to generate a first intermediate data;
a data switch coupled to the first multimedia data receiving interface and the multimedia data unpacking circuit and configured to combine the second multimedia data and the first intermediate data to generate a second intermediate data;
a multimedia data packing circuit coupled to the data switch and configured to pack the second intermediate data to generate the fourth multimedia data; and a multimedia data transmission interface coupled to the multimedia data packing circuit and configured to transmit the fourth multimedia data.

9. The multimedia audio/video system of claim 1, wherein the third data converter comprises:
- a multimedia data receiving interface configured to receive the fourth multimedia data;
- a multimedia data unpacking circuit coupled to the multimedia data receiving interface and configured to unpack the fourth multimedia data to generate a first intermediate data;
- a data switch coupled to the multimedia data unpacking circuit and configured to process the first intermediate data to generate the second multimedia data and a second intermediate data;
- a multimedia data packing circuit coupled to the data switch and configured to pack the second intermediate data to generate the third multimedia data;
- a first multimedia data transmission interface coupled to the data switch and configured to transmit the second multimedia data; and
- a second multimedia data transmission interface coupled to the multimedia data packing circuit and configured to transmit the third multimedia data.

10. The multimedia audio/video system of claim 1, wherein a resolution and a frame rate of the first multimedia data are respectively equal to a resolution and a frame rate of the second multimedia data.

11. The multimedia audio/video system of claim 2, wherein the first transmission protocol and the second transmission protocol are selected from a group consisting of eDP, V-by-One, EPI, CEDS, iSP, CSPI, CHPI, and CMPI.

* * * * *